United States Patent
Rackley et al.

(10) Patent No.: US 8,023,502 B2
(45) Date of Patent: Sep. 20, 2011

(54) LOAD TESTING FOR IP PBX SYSTEMS

(75) Inventors: David W. Rackley, Austin, TX (US);
Brian K. Hollowell, Austin, TX (US);
Michael T. Delaney, Jr., San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1241 days.

(21) Appl. No.: 10/218,710

(22) Filed: Aug. 14, 2002

(65) Prior Publication Data
US 2004/0032833 A1  Feb. 19, 2004

(51) Int. Cl.
*H04L 12/28* (2006.01)
(52) U.S. Cl. .......................... 370/389; 370/401
(58) Field of Classification Search .................. 370/352, 370/356, 389, 401, 241, 400; 379/232, 80
See application file for complete search history.

(56) References Cited

U.S. PATENT DOCUMENTS

| | | | |
|---|---|---|---|
| 6,359,981 B1 * | 3/2002 | Neyman et al. | 379/265.09 |
| 6,487,196 B1 * | 11/2002 | Verthein et al. | 370/352 |
| 6,519,228 B1 * | 2/2003 | Creamer et al. | 379/15.01 |
| 6,898,188 B1 * | 5/2005 | Hamami | 370/252 |
| 7,006,494 B1 * | 2/2006 | Tighe et al. | 370/389 |
| 7,079,495 B1 * | 7/2006 | Pearce et al. | 370/401 |
| 2001/0026545 A1 * | 10/2001 | Matsumoto et al. | 370/338 |
| 2001/0046215 A1 * | 11/2001 | Kim | 370/329 |
| 2002/0012428 A1 | 1/2002 | Neyman et al. | |
| 2002/0076034 A1 | 6/2002 | Prabhu et al. | |
| 2002/0093942 A1 * | 7/2002 | Yegoshin | 370/352 |
| 2002/0101860 A1 * | 8/2002 | Thornton et al. | 370/352 |
| 2002/0172191 A1 * | 11/2002 | Harrison | 370/352 |
| 2002/0191752 A1 * | 12/2002 | Jensen et al. | 379/142.01 |
| 2003/0028535 A1 * | 2/2003 | Sheldon et al. | 707/10 |
| 2003/0076846 A1 * | 4/2003 | Heinz et al. | 370/404 |
| 2004/0003070 A1 * | 1/2004 | Fernald et al. | 709/223 |

* cited by examiner

*Primary Examiner* — Ricky Ngo
*Assistant Examiner* — Phuongchau B Nguyen
(74) *Attorney, Agent, or Firm* — Jackson Walker L.L.P.

(57) ABSTRACT

A method of load testing an IP PBX. The IP PBX is connected to a LAN, to which a registration simulator is also connected. The registration simulator is used to load the IP PBX with registrations. Actual phone calls are then made on the LAN, to determine whether the loading has adversely affected performance of the IP PBX. In this manner, the maximum CPU capacity of the IP PBX can be determined.

9 Claims, 1 Drawing Sheet

LOAD TESTING FOR IP PBX SYSTEMS

TECHNICAL FIELD OF THE INVENTION

This invention relates to IP (Internet Protocol) telephony, and more particularly to testing IP PBX systems.

BACKGROUND OF THE INVENTION

PBX is short for private branch exchange, a private telephone network used within an enterprise. Users of a PBX share a certain number of outside lines for making telephone calls external to the PBX. Most medium-sized and larger companies use a PBX as a less expensive alternative to connecting an external telephone line to every telephone in the company. In addition, it's easier to call someone within a PBX because the number to dial is typically just 3 or 4 digits.

PBX architecture is undergoing an important transition from circuit-switched to packet-switched transmission and coding. The future of voice communications, using PBX systems, seems to be headed toward use of the Internet Protocol (IP).

While the design architectures of today's IP telephone systems are diverse, the basic concept is that an IP telephone works like a PC. It has a LAN card with a MAC address and an IP address. It communicates with an IP PBX via the IP protocol. Therefore, the IP PBX no longer tracks phone numbers to physical devices. As a result, a phone can be easily relocated to any functioning port without re-punching the line or changing the PBX port setting. Essentially, you can move phones from port to port like a PC, because the IP PBX no longer looks for the phone number at a physical location, it searches for the phone's IP address across the network. Phone numbers are encapsulated into an IP packet, transported across the network using the TCP/IP protocol and then de-encapsulated at the PBX.

VoIP (voice over Internet Protocol) is a technology devised to utilize existing IP infrastructures to carry voice. This can be accomplished by using intelligent phones that have both a MAC address (NIC card) and an IP address. A speaker's voice is encapsulated into an IP packet and transmitted to the PBX. This allows the phone to be identified by an IP address instead of a phone number. The reason behind this is so that like a computer, a phone can be relocated easily to any location without the need for patching or PBX reprogramming. Essentially, since the PBX now communicates to the phone using IP, it will know what phone number to send and receive voice information regardless of location.

DETAILED DESCRIPTION OF THE INVENTION

Figure 1:
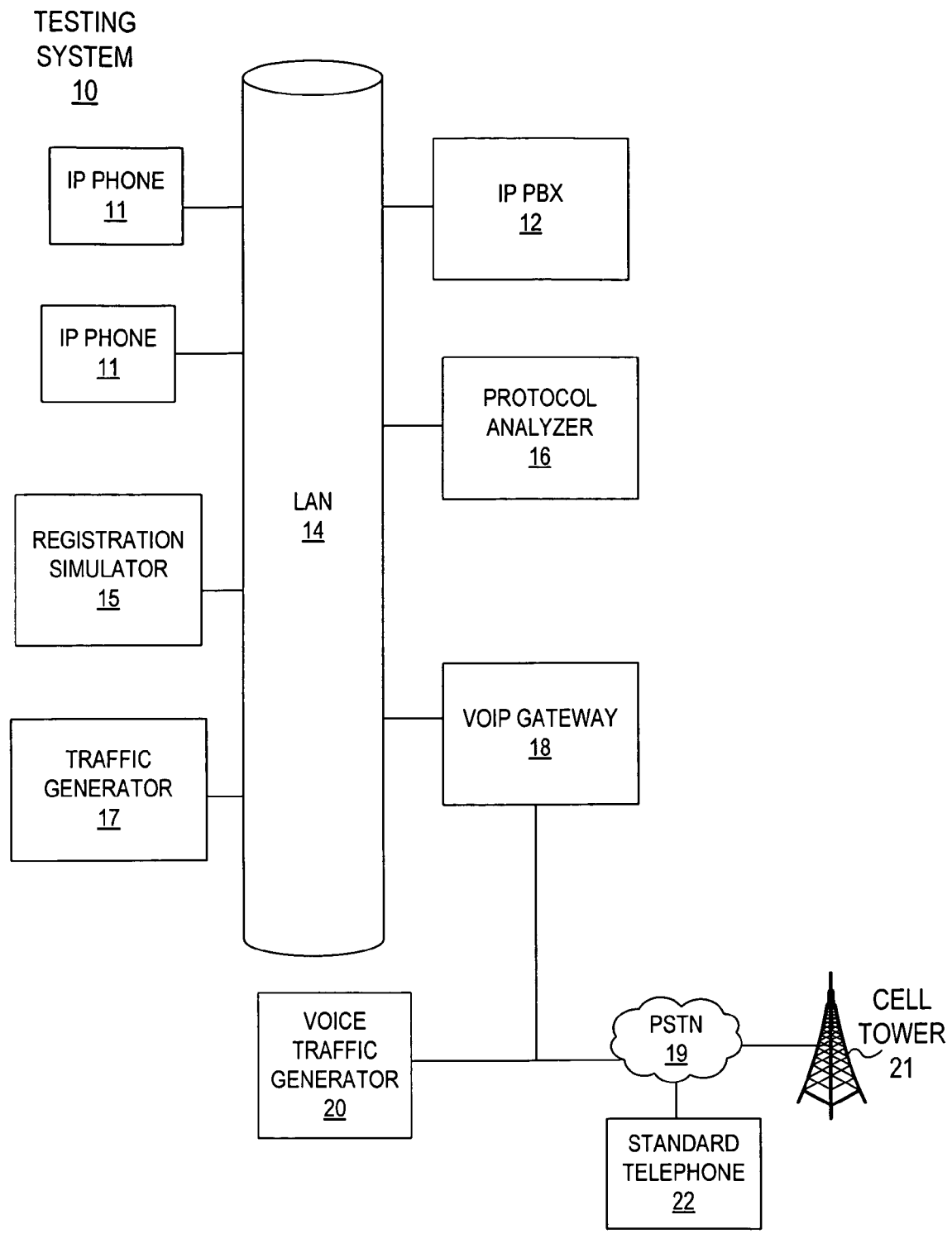
FIG. 1 illustrates an IP PBX load testing system in accordance with the invention.

FIG. 1 illustrates a load testing system 10 in accordance with the invention. As explained below, system 10 provides a means for load testing the IP PBX 12. The load testing appropriately involves LAN resources, telephone resources, and CPU resources within the IP PBX 12, and operates in conjunction with other test equipment that is commercially available.

IP PBX 12 is the PBX being evaluated. As indicated in the Background, a traditional PBX is a proprietary telephone-switching system that resides within an enterprise network and connects internal telephone extensions to each other and to the public switched telephone network. Vendors program their PBX with applications such as call hold, forwarding, and conference calling, and more complex call-center applications. Because traditional PBX technology is proprietary, customers usually have to ask their vendor to add new applications, and pay for the service. Similarly, traditional PBX vendors usually handle—and charge for—adding, moving, and changing telephone extensions. Eliminating these expenses for users by using open protocols is a benefit of IP PBX technology. As the name implies, IP PBX 12 delivers PBX-like services, but over IP-based LANs or WANs rather than circuit-switched networks. IP PBX systems can be designed as a single network server, a group of servers, or a network appliance. Despite widespread use of open protocols, no real standards have been agreed on for IP PBXs, so interoperability between IP systems, phones, and other devices, remains an issue.

In the example of this description, IP PBX 12 operates over a LAN 14 and is designed as a single network server. However, as indicated in the preceding paragraph, other configurations are possible and are compatible with the invention described herein.

Phone sets 11 are compatible with IP PBX 12. Phone sets 11 are "intelligent" phone sets, i.e., computers, that communicate across a LAN 14, using a predetermined protocol, which may vary depending on the manufacturer of IP PBX 12. Other types of endpoints may also be connected to LAN 14, such as analog telephones or PCs with a telephone application installed.

One task of phone sets 11 is to "register" with a call processor. Because the phone is assigned an IP address, the LAN automatically reads the address. An IP number is analogous to a telephone number; it uniquely identifies a machine, but it does not identify a user.

Registration simulator 15 consists of software components that communicate with IP PBX 12 using the protocols native to IP PBX 12. As explained below, simulator 15 eliminates the need to use actual phone sets for loading IP PBX 12, by performing simulated connections and registrations with IP PBX 12. Simulator 15 need not make place or receive actual phone calls. Protocol analyzer 16 monitors activity on the LAN 14 and verifies protocols in use on the LAN 14. An example of a suitable protocol analyzer 16 is the Internet Advisor, manufactured by Agilent Corporation.

Data traffic generator 17 loads LAN 14 with simulated data flows. An example of a suitable traffic generator 17 is the Smartbits traffic generator manufactured by Spirent Communications.

Gateway 18 permits IP PBX 12 to communicate with the public switched telephone network (PSTN) 19.

Voice traffic generator 20 generates voice traffic flows, the same type of traffic as would be created by actual users. Voice traffic generator 20 may also include testing features, such as for connection testing and DTMF testing. Voice traffic generator 20 may also test and report the quality of service for both voice and DTMF signals. An example of a suitable voice traffic generator 20 is the Hammer VoIP Test System, manufactured by Empirex.

Cell towers 21 represent communication links to cell phone systems. This permits end to end quality of service testing for wireless as well as wire line networks.

Phone set 22 represents one or more conventional phone sets that may be connected to PSTN 19.

In operation, simulator 15 registers a given number of simulated telephones with IP PBX 12. Each registration uses memory resources of IP PBX 12. The registration may include providing a unique Media Access Control (MAC) address, a unique IP address, and the type of phone set being simulated. The number of telephone sets and MAC addresses that are registered are tracked. It can then be determined whether the claimed capacity of IP PBX, especially in terms of its memory resources, matches the number actually supported by IP PBX 12.

Data files containing MAC and IP addresses and telephone types may be developed and re-used. This permits different runs of simulator 15 to produce consistent sets of results in terms of numbers of telephone sets and MAC addresses that can be supported by IP PBX 12.

While IP PBX 12 is loaded with simulated registrations, phone sets 11 are used to make real telephone calls. Successful call placement indicates the IP PBX 12 has an actual loading capacity equivalent to the simulated loading. Specifically, the CPU capability of IP PBX 12 may be determined by determining the maximum registrations that it may achieve while still handling new calls.

Additional functions of simulator 15 include providing signaling to convince IP PBX 12 that simulator 15 is an authorized telephone set type. It may also be programmed to respond to "keep alive" polling requests from IP PBX 12. Simulator 15 may further be programmed to de-register with IP PBX 12 when simulator 15 ends execution.

For further testing system 10 while IP PBX 12 is loaded with simulated registrations, LAN 14 may be loaded with data traffic. For this purpose, data and voice traffic may be generated using data traffic generator 17 and voice traffic generator 20. Gateway 18 is used in conventional manner so as to permit the LAN 14 and the voice network 19 to communicate. At this point, IP PBX 12 can be examined to determine whether it is properly handling the traffic.

During the network loading, protocol analyzer 16 may be used as an observation tool. It verifies that IP PBX is using the appropriate protocols.

What is claimed is:

1. A method of load testing an IP PBX, comprising:
simulating, with a simulator connected to the IP PBX, a telephone registering with the IP PBX;
wherein the simulating includes providing, with the simulator, registration information to the IP PBX wherein the registration information indicates a type of telephone and includes a MAC address and an IP address;
providing, by the simulator, signaling to the IP PBX representing authorization for a telephone; and
wherein the simulator lacks functionality to place telephone calls and to receive telephone calls.

2. A method of loading an IP PBX, comprising:
simulating, with a simulator in communication with the IP PBX, registration of an IP phone with the IP PBX by providing registration information suitable for identifying an IP phone to the IP PBX wherein the IP PBX is loaded without using an IP phone and further wherein the simulator is inoperable to place telephone calls and to receive telephone calls; and
providing, by the simulator, signaling to the IP PBX representing authorization for a telephone.

3. The method of claim 2, wherein the registration information includes a MAC address.

4. The method of claim 2, wherein the registration information includes an IP address.

5. The method of claim 2, wherein the registration information indicates a type of telephone.

6. The method of claim 2, further comprising the simulator responding to keep alive polling requests from the IP PBX.

7. The method of claim 2, further comprising the simulator de-registering with the IP PBX.

8. The method of claim 2, further comprising connecting the IP PBX and the simulator on a LAN and generating data traffic on the LAN.

9. The method of claim 2, wherein the IP PBX and the simulator are connected on a LAN and further comprising using a gateway to connect the LAN to a voice network and generating voice traffic on the voice network.

* * * * *